W. HESS, Jr.
SCALE.
APPLICATION FILED MAY 29, 1912.
1,175,448.
Patented Mar. 14, 1916.
2 SHEETS—SHEET 1.
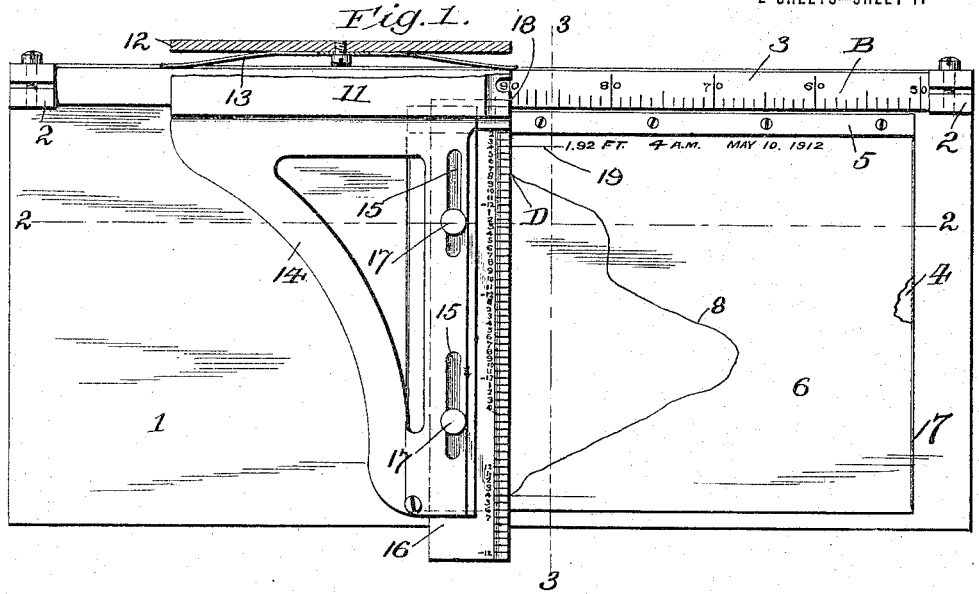
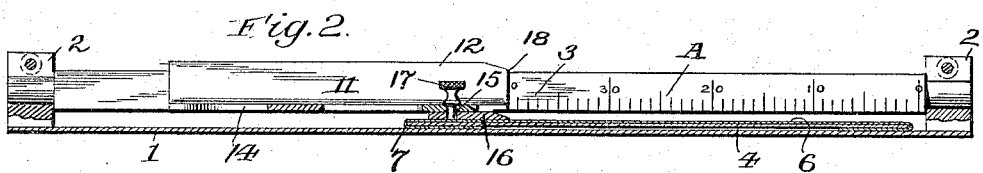
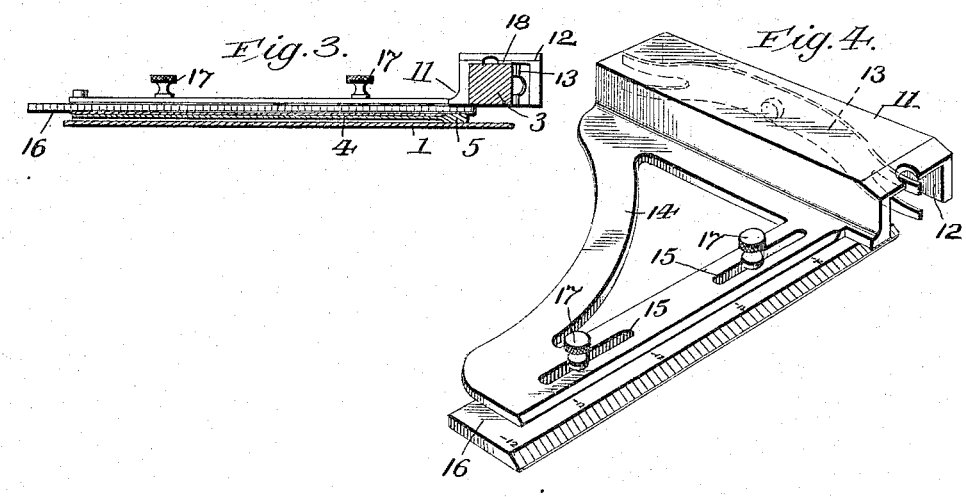
Witnesses:
Inventor:
Wendell Hess Jr.,
By Dodge & Son
Attorneys.

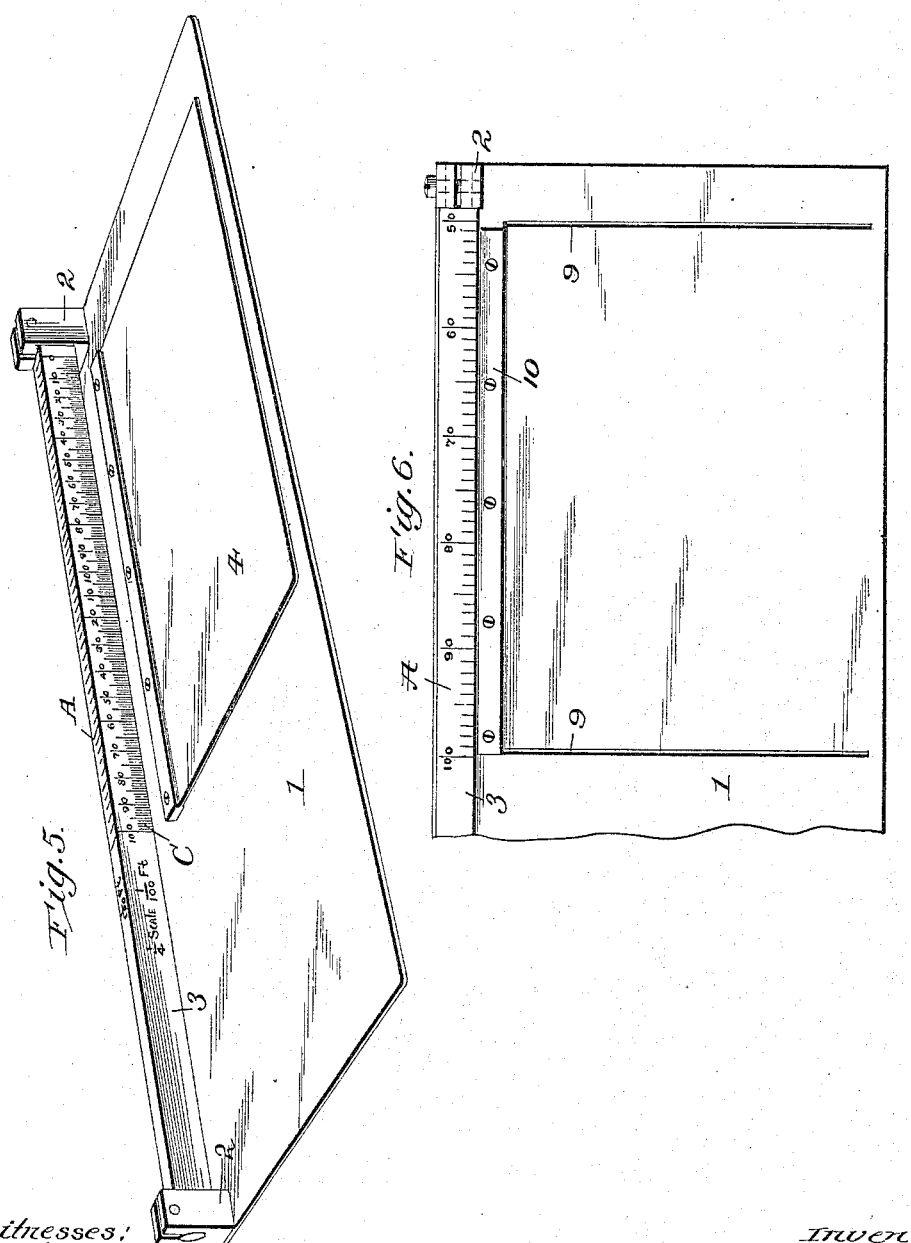

UNITED STATES PATENT OFFICE.

WENDELL HESS, JR., OF TROY, NEW YORK, ASSIGNOR TO W. & L. E. GURLEY, A CORPORATION OF NEW YORK.

SCALE.

1,175,448.

Specification of Letters Patent.

Patented Mar. 14, 1916.

Application filed May 29, 1912. Serial No. 700,477.

*To all whom it may concern:*

Be it known that I, WENDELL HESS, Jr., a citizen of the United States, residing at Troy, in the county of Rensselaer and State of New York, have invented certain new and useful Improvements in Scales, of which the following is a specification.

This invention relates to measuring instruments and particularly to a device intended to measure and interpret continuous records plotted by a recording device.

Certain features of the device are such as particularly adapt it to the interpretation of records made by a device described and claimed in my co-pending application for a patent on improvements in recorders. Serial No. 697,459, filed May 15, 1912. This application has since resulted in Patent No. 1,105,906, granted August 4, 1914.

So far as is necessary to an understanding of the present invention, that machine may be said to comprise a cylindrical record drum rotated by some moving object, such as a float and a recording stylus bearing against the cylindrical face of the drum and propelled along an element thereof by a clock mechanism. The record made by this device is traced on a plurality of contiguous short strips of paper each mounted on the periphery of the drum by inserting its ends through slots therein and clamping them to radial springs within the drum. The resulting record consists of a series of separate sheets of paper each having adjacent its ends transverse creases caused by drawing the paper sheet through the slots, and each bearing a portion of a continuous record plotted between time and position of the object. The record sheets are devoid of all coördinate lines and the present device is intended to interpret the record sheets by accurately positioning them with reference to two graduated scales according to their former position on the drum. For this purpose advantage is taken of the aforementioned creases, which being caused by drawing the ends of the sheets through the slots form an accurate index of the position of the sheet on the drum.

Additional features of my present invention relate to the adaptation of such a measuring device to the measurement of records from machines having different drive ratios between the moving object and the recording drum.

I have successfully embodied the invention in a device for interpreting records each section of which has an effective length of six inches, and this is illustrated in the accompanying drawings, in which—

Figure 1 is a plan view of the complete device, certain parts being broken away, and the record sheet being shown mounted in position; Fig. 2 is a section on the line 2—2 of Fig. 1; Fig. 3 is a section on the line 3—3 of Fig. 1; Fig. 4 is a perspective view of the sliding carriage and the rotatable scale bar; Fig. 5 is a perspective view of the record support and the rotatable scale bar mounted thereon; and Fig. 6 is a plan view of a portion of a modified form of record support.

Referring to the drawings 1 represents the base plate which is preferably made of sheet metal as shown. This is provided at its rear edge with two upstanding lugs 2 in which is journaled a prismatic bar 3, preferably having four faces, the different faces being graduated differently. The character of these graduations will later be set forth more fully.

Near the right hand end of the base plate 1 is a holding plate 4 spaced slightly from the base plate 1 so as to permit the insertion between the base plate 1 and the plate 4 of a sheet of paper. The plate 4 is attached to the base plate 1 only at its rear edge and upon its upper face along the line of attachment and parallel to the edge of the bar 3 is a raised straight edge 5, which is intended to serve as a guide in positioning the record sheet. This record sheet, as indicated at 6 in Figs. 1 and 2 consists of a strip of paper having transverse folds or creases 7, adjacent its ends, and the record sheet is mounted in the device by placing it upon the plate 4 with its ends folded under the plate and lying between it and the base plate 1, the record sheet 6 being pushed up against the straight edge 5 to position it in parallelism with the bar 3. These record sheets accurately fit the plate 4 having been properly creased by their previous mounting in the recording device mentioned, so that the position of these creases serves to position the record sheet longitudinally with reference to the scales on bar 3. The record consists of an irregular line 8 traced by the recording device as will be apparent from an examination of my patent above referred to.

In Fig. 6 I illustrate an alternative construction in which a separately formed plate 4 is dispensed with. In this case the plate 1 is provided with two parallel slots 9 which are spaced apart a distance equal to the length of the record sheet between its creases. A straight edge 10, similar in form and function to the straight edge 5, is used. The record is mounted in the device by inserting its ends through the slots 9 and folding them toward each other at the creases. That portion of the plate 1 lying between the slots 9 takes the place of the separately formed plate 4 used in the preferred construction and retains the record in the same manner.

The bar 3 serves as a guide for a longitudinally movable carriage 11, which consists of a guide frame 12 straddling and guided by the bar 3. It is guided by direct contact with the forward face of the bar 3 and is held resiliently in engagement therewith by a bow-spring 13 as clearly shown in Fig. 1. The carriage 11 is provided with a forwardly extending bracket 14 having slots 15 at right angles to the line of movement of the carriage and consequently at right angles to the bar 3. A transverse scale 16 graduated in hourse of time is adjustably mounted upon the carriage 11 by means of set screws 17 passing through the slots 15, and this scale is so mounted as to slide closely over the face of the record. The purpose of the slots 15 is to permit an accurate adjustment of the scale with reference to the actual time interval during which the record was taken so that the scale may be adjusted to read in hours directly. The scale of spacing of the graduations of this time scale 16 is wholly dependent upon the rate of feed of the recording pencil by the clock forming a part of the recording device whose records are to be interpreted. The purpose of rotatably mounting the bar 3 is to permit different faces of the bar 3 provided with different forms of graduations, to be brought into coöperative relation with the index edge 18 of the carriage 11. For instance the scale A shown in Fig. 2, is used to measure the records of a recording device in which the movements of a body are recorded in hundredths of a foot and in which the record is made full size. The range of this scale is from 0 to 0.5 foot, while scale B shown in Fig. 1 is used to measure similar records, but is intended for measuring the sections thereof lying between 0.5 foot and 1.0 foot. The scale C shown in Fig. 5 is graduated in hundredths of a foot and is intended for interpreting records of a machine in which the scale of record is one fourth size. The range of one section of a six inch record is therefore 2.0 feet as clearly indicated in Fig. 5. The device is therefore available to interpret records made by various machines having different drive ratios between the record drum and the moving body whose movements are recorded, and by increasing the number of faces on the bar 3 a larger number of scales might be embodied in a single instrument though I have found the form shown to be satisfactory for ordinary purposes.

In the use of the device the record sheet is mounted in the machine in one of the ways above described according to the form of the machine. The bar 3 is then turned so that the appropriate graduated face is at the top. The carriage 11 is then slipped into place. The scale 16 is then adjusted so that the proper hour on the scale coincides with a line 19 which is marked on the record sheet at the time the record is started. In the example illustrated for instance the 4 graduation is placed in registry with the line marked "4 a. m." The corresponding position of the object whose positions are recorded may be then read for any desired time by moving the carriage 11 along the bar 3 until the desired time graduation coincides with the record line 8. For instance in the example illustrated at 8 a. m. on May 10th, the stage was 0.90 foot, as indicated at the point marked D in Fig. 1.

In all ordinary positions the scale 16 extends beneath the bar 3 and this serves to prevent any accidental displacement of the carriage as the device is in use.

A particularly important feature of my invention is the fact that the record sheet is positioned in the device by means of creases made in the record sheet by the act of placing it upon the record drum, consequently these creases serve as an accurate means for positioning the sheet in the measuring devices and all coördinate rulings and graduations of the record sheet become wholly unnecessary.

In the claims I use the phrase "record support" as a generic term in contradistinction from the more specific terms "base" and "retaining plate" used in the claims specific to the construction shown in Figs. 1, 2, 3 and 5.

Having thus described my invention, what I claim is:—

1. In a device for interpreting records made on sheets having transverse creases adjacent their ends, the combination of a base; a retaining plate of substantially the dimension of the record sheet between said creases, mounted on the base and spaced therefrom to receive the infolded ends of the record sheet to position and hold the latter; a carriage; means mounted on said base for guiding said carriage longitudinally on said base and for measuring its longitudinal position with reference to a record sheet held by said plate; and a transverse graduated scale on said carriage.

2. In a device for interpreting records made on sheets having transverse creases adjacent their ends, the combination of a record support having a portion of substantially the dimensions of said sheet between said creases and adapted to receive and retain the ends of said sheet when folded toward each other at said creases; a carriage; means mounted on said record support for guiding said carriage longitudinally and for measuring its longitudinal position with reference to a record sheet held by said record support; and a transverse graduated scale on said carriage.

3. The combination of a base; a measuring device mounted thereon; and a record receiving plate mounted on said base within the range of action of said measuring device, free from said base at two opposite sides and spaced from said base sufficiently to receive between the base and the plate along said opposite edges the infolded ends of a record sheet.

4. In a device for interpreting records made on sheets having transverse creases adjacent their ends, the combination of a record support having a portion of substantially the dimensions of said sheet between said creases, and provided with slot-like apertures at the boundaries of said portion for receiving and retaining the ends of said sheet when folded toward each other at said creases; and a measuring device mounted on said record support for interpreting the record on a sheet held thereby.

5. In a measuring device the combination of a base provided with means to position and support a record sheet; a prismatic longitudinal guide bar mounted on said base to rotate about its longitudinal axis and provided with different series of graduations on its different faces; a carriage adapted to be mounted on said guide bar and to be guided thereby in coöperative relation with any of said series of graduations and a transverse scale carried by the carriage.

6. In a measuring device, the combination of a base; a retaining plate mounted on the base and spaced therefrom to receive and retain the infolded ends of a record sheet; a prismatic longitudinal guide bar mounted on said base to rotate about its longitudinal axis, and provided with different series of graduations on its different faces; a carriage adapted to be mounted on said guide bar and to be guided thereby in coöperative relation with any of said series of graduations and a transverse scale carried by the carriage and transversely adjustable thereon.

In testimony whereof I have signed my name to this specification in the presence of two subscribing witnesses.

WENDELL HESS, Jr.

Witnesses:
C. S. HALLENBECK,
W. S. HOPKINS.